(12) United States Patent
Semret et al.

(10) Patent No.: US 7,792,724 B2
(45) Date of Patent: Sep. 7, 2010

(54) SYSTEM AND METHOD FOR ALLOCATING RESOURCES USING SPOT MARKET AND DERIVATIVE MARKET TECHNIQUES

(75) Inventors: Nemo Semret, New York, NY (US); Aurel Lazar, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 404 days.

(21) Appl. No.: 11/851,920

(22) Filed: Sep. 7, 2007

(65) Prior Publication Data
US 2007/0297328 A1  Dec. 27, 2007

Related U.S. Application Data

(63) Continuation of application No. 09/383,094, filed on Aug. 25, 1999, now Pat. No. 7,290,009.

(51) Int. Cl.
*G06F 17/60* (2006.01)
(52) U.S. Cl. .......................................... 705/35; 705/37
(58) Field of Classification Search ................. 213/153; 705/26, 37; 703/6
See application file for complete search history.

(56) References Cited

U.S. PATENT DOCUMENTS
2001/0047322 A1*  11/2001  Plate et al. ..................... 705/37

FOREIGN PATENT DOCUMENTS
WO  PCT/US99/06384  3/1999

OTHER PUBLICATIONS
Frank A. Wolak, Identification and Estimation of Cost Functions Using Observed Bid Data: An Application to Electricity Markets. Jan. 2002, Standford University, web, 1-30.*

(Continued)

*Primary Examiner*—James P Trammell
*Assistant Examiner*—Marissa Liu
(74) *Attorney, Agent, or Firm*—Miles & Stockbridge PC; Mark A. Catan (57) ABSTRACT

A method for controlling access to a system of finite resources with excess demand employs a two stage admission process. Subscribers are first admitted based on an initial bid price and resource availability. The market price is determined by the highest bid price among the rejected arrivals in the current batch. Admitted subscribers are then given the option to secure continued access to the resource by accepting a fee-based reservation. The fee for the reservation is determined in a manner which is fair to the reserving subscriber, as well as all other subscribers, in that the reservation fee is priced to provide access at a cost which prevents arbitraging opportunities. If the current market price exceeds a non-reserved subscriber's bid price, that non-reserved subscriber is displaced. If the current market price exceeds a reserved subscriber's bid price, that reserved subscriber's reservation is activated and access to the resource continues. In the case of a communications system having a finite number of access lines, the reservation fee is based on the bid price from the subscriber and the duration of the requested reservation.

7 Claims, 5 Drawing Sheets

OTHER PUBLICATIONS

"T-Rex Not a Dinosaur!"; Nemo Semret; Center For Telecommunications Research—Columbia University, Project For CS 6998-41: Adv. Scripting Languages.

"Spot and Derivative Markets in Admission Control"; 16th Intl. Teletraffic Congress, Edinburgh, UK; Jun. 1999; Nemo Semret and Aurel A. Lazar; Dept. of Electrical Engineering; Columbia University, New York, NY, 010027-6699 U.S.A.

"Market Pricing Of Differentiated Internet Services"; Nemo Semret, Raymond R.F. Liao, Andrew T. Campbell and Aurel A. Lazar; Center for Telecommunications Research, Columbia University, New York, NY 10027-6699, U.S.A.

"Market Mechanisms for Network Resource Sharing"; Nemo Semret; Submitted in Partial Fulfillment of the Requirements for the Degree of Doctor of Philosophy in the Graduate School of Arts and Sciences; Columbia University; 1999.

CTR Technical Report; CU/CTR/TR 468-97-02; "Auctions for Network Resource Sharing"; Aurel A. Lazar and Nemo Semret; Center for Telecommunications Research; Columbia University; Feb. 11, 1997.

International Telecommunication Union, "Series Y: Global Information Infrastructure, Internet Protocol Aspects and Next Generation Networks," Operation & Maintenance Mechanism for MPLS Networks (2004).

Nadeau et al., "OAM Requirements from MPLs Networks," *Network Working Group*, Internet Draft (2004).

\* cited by examiner

FIG. 5

SYSTEM AND METHOD FOR ALLOCATING RESOURCES USING SPOT MARKET AND DERIVATIVE MARKET TECHNIQUES

CROSS-REFERENCE TO RELATED APPLICATIONS

This application is a continuation of U.S. patent application Ser. No. 09/383,094 filed Aug. 25, 1999 which is incorporated by reference in its entirety herein.

FIELD OF THE INVENTION

The present invention relates generally to market based allocation of limited resources, and more particularly relates to systems and methods for allocating modem lines to subscribers based on spot market and derivative market models.

BACKGROUND OF THE INVENTION

A significant problem is created when demand for a finite resource outpaces the supply of the resource. When the demand for a resource or product exceeds the supply, market auctions can be created in order to properly allocate the limited resource or product to the requesting entities. For example, a finite commodity such as oil is only produced in limited quantities per month and the oil is auctioned and sold in international markets. If only one million barrels of oil are produced in a month, bidders can submit bids through the international market and typically the highest bidder will win its requested allocation of the oil and will pay the supplier of the oil the price which was bid.

The problem of allocating finite resources also occurs in the electronic world. The Internet allows parties to communicate and exchange data over vast distances. However, the rate of information flow can be affected by the number of users utilizing an Internet Service Provider ("ISP") and users are forced to endure long pauses in their network connections. If critical data needs to be transmitted and received almost instantaneously over a network, premium bandwidth of an ISP can be reserved for that user. While premium bandwidth can be provided by an ISP, the bandwidth is a limited resource and many users will desire all or part of the available premium bandwidth. A standard auction of the bandwidth would consist of the premium bandwidth being allocated to the highest bidder for which the bidder pays the price of the bid. However, this type of auction produces inefficiencies for larger numbers of bidders and where the bids made and availability of the premium bandwidth change over time. Other allocation mechanisms require exchanging large messages to convey demand information and are inappropriate for communication networks due to the heavy signaling load they would impose. An improved auction and allocation technique is needed.

In order to achieve a system of improved allocation of resources, some economic principles can be applied. The example of allocating the discrete resource of communications lines for access to a data communications network will be used in the following discussion. A communication network's value such as the Internet can be characterized by what economists call externalities. The principles of externalities are that the value a user gets from the network depends upon the valuation and behavior of the other users. One recognized principle is that a communication network is more valuable to a user if more people are connected to the network. A second recognized principle is that as the utilization of the network by one user increases, the quality of service obtained by the other users decreases. Resources are shared by users who because of distance, population size, or individual selfishness cannot or will not coordinate their actions sufficiently to achieve the most desirable allocation of resources. This externality principles model indicates that a game theoretic approach in which other bidders actions are determinative of allocations and costs to a bidder could be used to improve the allocation of resources on a communication network.

The same type of problem presents itself with the allocation of discrete telephone lines which through dial-up servers provide access to the Internet to the vast majority of subscribers. Unlike communications bandwidth, which can be dynamically subdivided and apportioned, the number of telephone lines is a fixed quantity for a given system and each line can only be allocated to one user for a given time duration of a call. The primary business model currently used to allocate these resources is first-come-first-served access with a flat-fee monthly pricing plan. Such a system, while simple to administer, is not a market efficient allocation method. Users are encouraged to access the system at off-peak times, and maintain a connection regardless of current need, in the event that access may be required at a later, peak time, when securing access is more difficult. This undesirable arbitraging wastes resources which could be used by other subscribers. Clearly, a market efficient method of allocating the telephone users among competing subscribers is required to prevent this undesirable result.

The allocation of limited resources in connection with a communications network can be performed in both an actual market embodiment, when users are bidding real dollars or other items of value, and a private system embodiment, where the bids are presented against internal budget allocations in order to obtain limited resources of the processing entity. For example, different university departments could bid on time used on a special university component with university dollars supplied by the university.

In emerging multi service networks (ATM, Next-Generation Internet), flat pricing as used in the current Internet is not a viable solution to achieving an efficient allocation of resources. Thus there is a need to develop a new approach to pricing of network resources. The requirements of an efficient pricing system include: (1) sensitivity to the range of resource requirements (either through a sufficiently broad range of traffic classes which are priced differently or by allowing users to explicitly quantify resource requirements); (2) prices should be dynamically responsive to unpredictable demand (market based system); and (3) the pricing architecture should constrain as little as possible the efficiency trade-offs. It would be desirable to achieve an auction technique which meets the above requirements and provides a more efficient allocation of a finite resource.

SUMMARY OF THE INVENTION

It is an object of the present invention to provide a method whereby a finite resource is efficiently allocated in accordance with market conditions in a manner that prevents arbitraging opportunities.

It is a further object of the present invention to allocate a limited number of modem lines among competing subscribers based on spot and derivative market models, such that modem lines can be reserved in a market efficient manner.

In accordance with the present invention, a method for allocating a finite resource among subscribers in a system having a first stage and a second stage, includes the steps of queuing arriving subscribers bidding for an allocation of the resource in the first stage and determining an available capacity in the second stage. Periodically, at least a portion of the arriving subscribers are admitted into the second stage based on respective bid amounts and second stage resource availability. The method includes the operations of determining a spot price of the resource based on at least one arrival subscriber not admitted and offering a reservation, having a reservation fee, for the resource to admitted subscribers to secure a future allocation of the resource at a given bid price. Subscribers accepting the reservation fee are admitted as reserved subscribers, those rejecting the reservation fee are admitted as non-reserved subscribers.

In the event that the current spot price exceeds a non-reserved subscriber's bid price, the method includes discontinuing the allocation of the resource to that subscriber. In the event that the spot price exceeds a reserved subscriber's bid price, the method activates the reserved subscriber's reservation and continues the allocation of the resource to that subscriber for the extent of the reservation.

In the above method for allocating a resource among subscribers, the reservation fee can be calculated based on the bid price and duration of the reservation requested by a subscriber. The reservation fee is generally inversely proportional to the bid price and directly proportional to the requested duration of the reservation. This provides a fair price that discourages arbitraging of the resource.

A network access computer server system for controlling a plurality of network access lines to provide subscriber access to a computer network is also provided. The access computer system includes an access line interface for partitioning the plurality of network access lines as first stage lines and second stage lines. A processor is included which is operatively coupled to the access line interface. The processor performs the tasks required to implement the method described above, including: determining an available number of second stage access lines; queuing arriving subscribers bidding for network access in the first stage access lines and periodically admitting at least a portion of the arriving subscribers into the second stage access lines based on respective bid amounts and second stage line availability; determining a spot price of the network access based on at least one arrival subscriber not admitted; determining a reservation fee for secured access to the network for the admitted subscribers to secure future network access at a given bid price; determining whether a subscriber has accepted the reservation fee and controlling the access line interface to operatively couple that subscriber to the network via a second stage line as a reserved subscriber; determining whether a subscriber has rejected the reservation fee and controlling the access line interface to operatively couple that subscriber to the network via a second stage access line as an unreserved subscriber; controlling the access line interface to disconnect from the network non-reserved subscribers whose bid prices are below the spot price; and activating a reservation of reserved subscribers whose bid price is below the spot price, and controlling the access line interface to maintain network access for the reserved subscriber for a duration of the reservation. The server system also includes a computer data storage device, such as a computer hard drive or optical storage system, operatively coupled to the processor, for storing a database of subscriber account data.

BRIEF DESCRIPTION OF THE DRAWING

Further objects, features and advantages of the invention will become apparent from the following detailed description taken in conjunction with the accompanying figures showing illustrative embodiments of the invention, in which.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF PREFERRED EMBODIMENTS

A method of establishing pricing of capacity in a service system in accordance with the present invention proceeds along two operational stages. In a first stage, subscribers seeking access to the system provide an initial bid for such access. This process preferably employs a second price auction technique, as described in copending Patent Cooperation Treaty application designating the United States, Serial No. PCT/US99/06384, filed on Mar. 23, 1999 and entitled "SYSTEM AND METHOD FOR PERFORMING A PROGRESSIVE SECOND PRICE AUCTION TECHNIQUE", which is hereby incorporated by reference. In the second price auction technique, the number of available resources (r) are distributed to the r highest bidders. Each of the r highest bidders then pay an amount equal to the $r+1^{th}$ bid, which represents the highest dropped bid price and is the current market price (spot price) of the resource. The first stage process is repeated periodically to admit new subscribers and refresh the market price. Once a subscriber is admitted, it is given an opportunity to reserve a block of the resource at the current market price by paying a reservation fee. This is referred to as a hold option. The price of the hold option, or reservation fee, is calculated based on the subscriber's bid price and the duration of the requested reservation. If a subscriber does not enter a hold option, that subscriber's allocation of the resource is unreserved. If the market price exceeds the unreserved subscriber's bid price, that subscriber is dropped from the system in favor of a newly admitted subscriber. However, if the subscriber secures a reservation, when the market price exceeds the subscriber's bid price, then the reservation is activated and the subscriber can maintain access for at least the duration of the reservation. Properly calculated, the hold option ensures an efficient pricing of the resource which allocates the resource based on need and reduces the opportunity for resource arbitraging. The present systems and methods are particularly well suited for allocating modem lines in a dial-up access communications network.

The present invention will be described in connection with a communications system wherein a finite number of communications lines must be allocated to a number of subscribers which may, and in fact is expected to, exceed the available number of communications lines.

Figure 1:
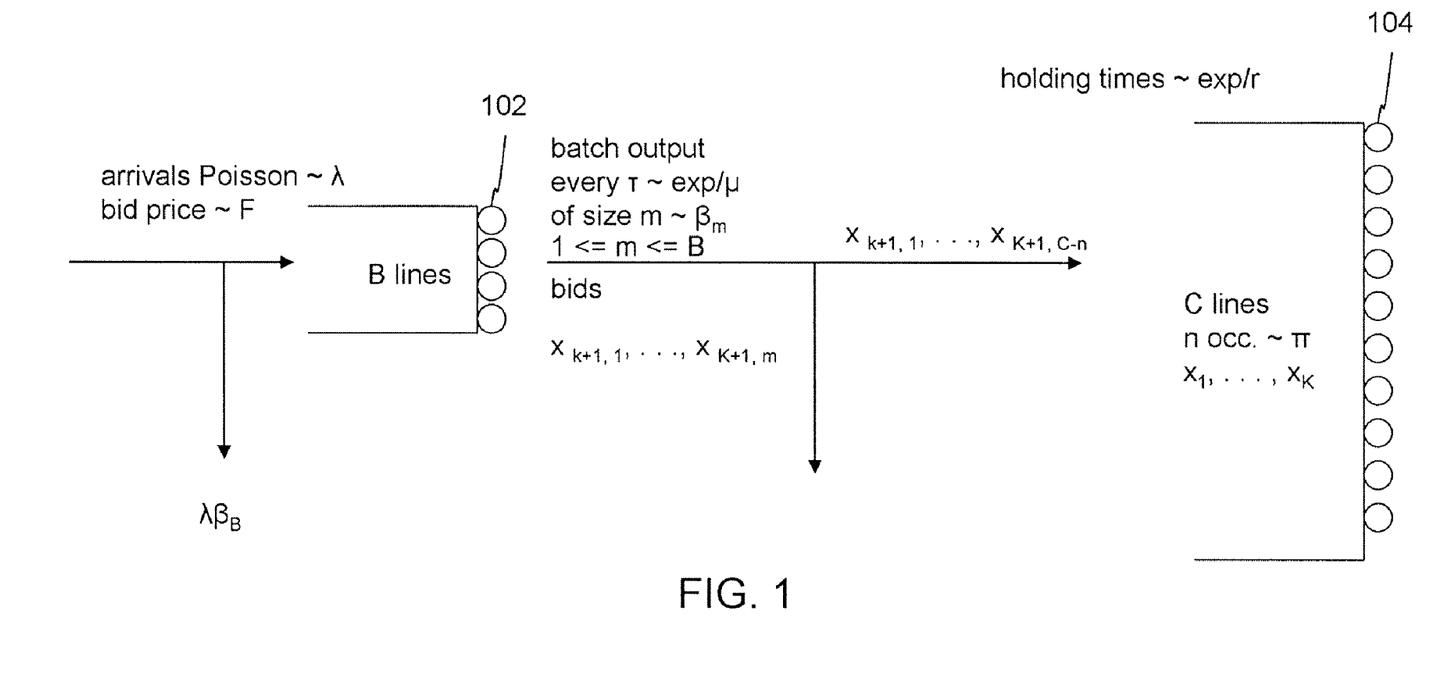
FIG. 1 is a block diagram illustrating the modem lines in a two-stage network access line allocation system, formed in accordance with the present invention.

FIG. 1 is a block diagram illustrating an exemplary system of modem lines in a two-stage resource allocation system formed in accordance with the present invention. The total resource, i.e., number of communication lines, is partitioned in a first stage having a number of lines 102 equal to B and a second stage having a number of lines 104 equal to C. Thus, the total resource in this exemplary embodiment is B+C lines. Each of the lines is capable of supporting only a single subscriber and generally cannot be partitioned.

Figure 2:
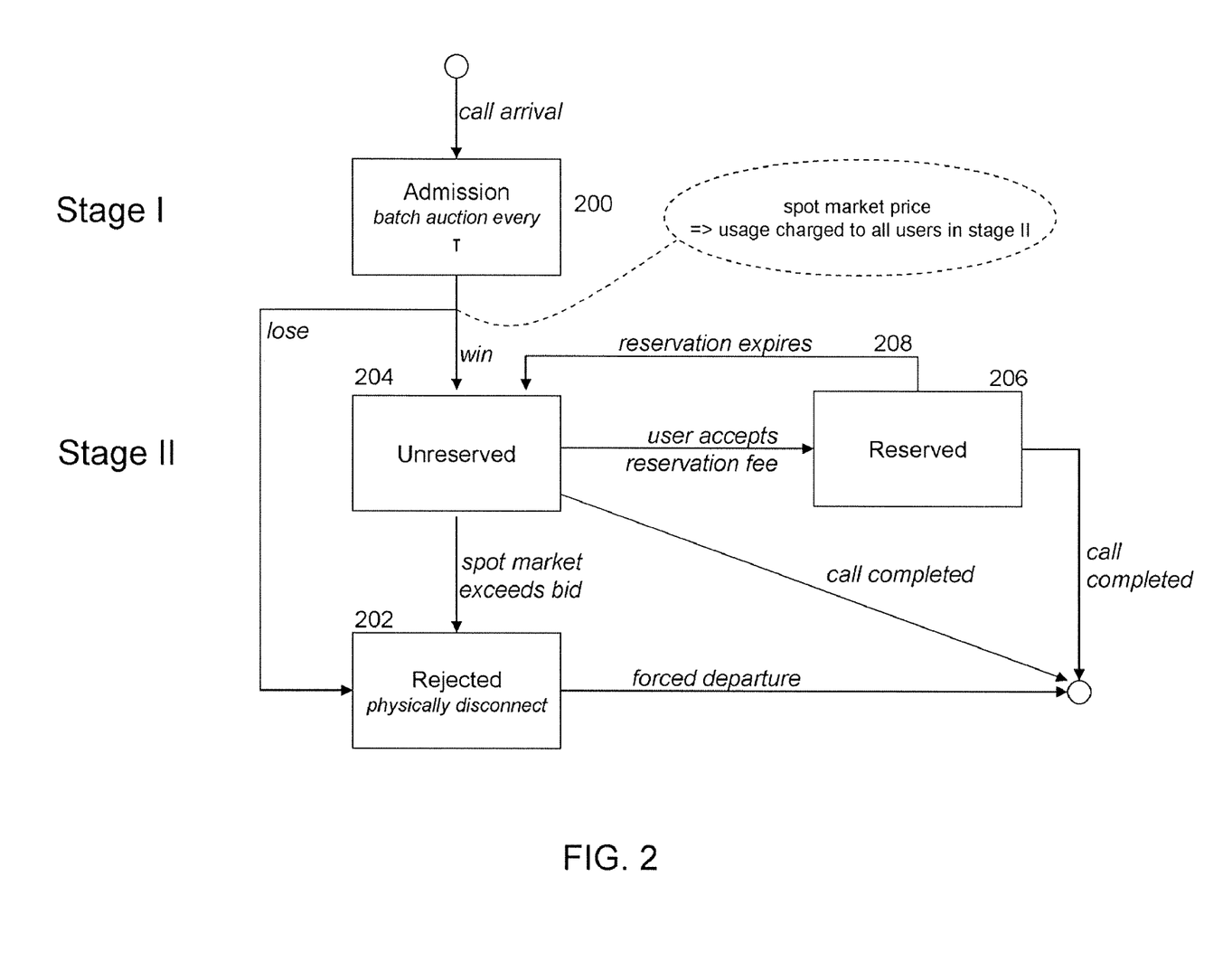
FIG. 2 is a flow chart illustrating a method of allocating computer network access lines to subscribers in accordance with the present invention.

FIG. 2 is a simplified flow chart illustrating a method of the present invention, which will be described in connection with the block diagram of FIG. 1. Subscribers wishing to obtain an allocation of the resource enter a first stage admission auction 200. Referring to FIG. 1, up to B subscribers can simultaneously participate in the first stage admission auction by entering a bid price for access to a communication line. Subscribers at the first stage auction are admitted based on unreserved capacity in the second stage and their bid price. Unreserved capacity is equal to the number of lines in the second stage (C) less the current number of reserved subscribers currently in the second stage (n). Thus, at any time, there are C−n unreserved lines available to m subscribers in the first stage. Thus, when second stage capacity is exceeded, m−(C−n) subscribers must be dropped from the first stage. In the case of the communications line example of FIG. 1, unreserved subscriber's are physically disconnected from the system (step 202).

Figure 3:
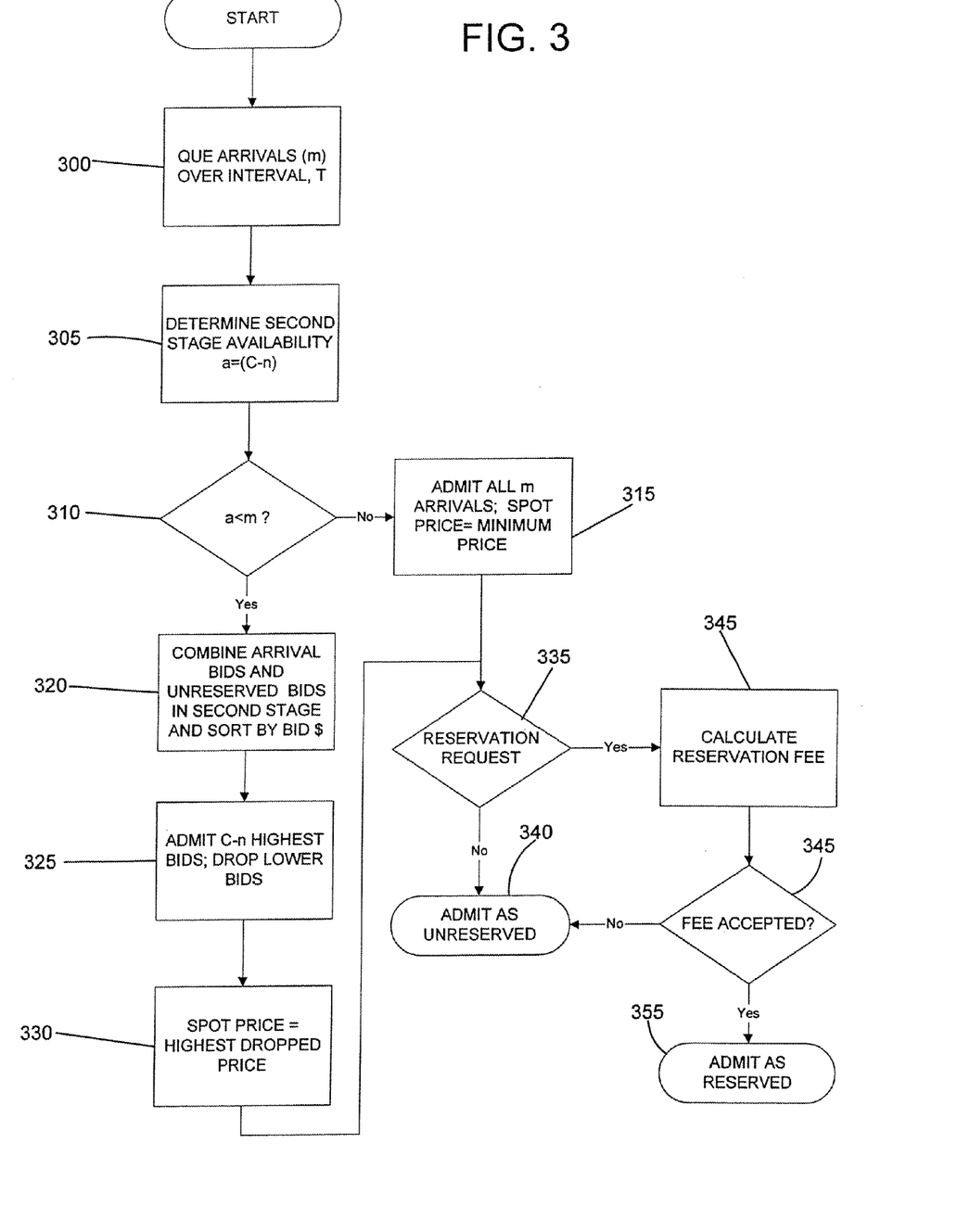
FIG. 3 is a flow chart illustrating a method of admitting subscribers into a system of a limited resource, in accordance with the present invention.

The above described process is further illustrated in the flow chart of FIG. 3. Arrivals into the system are placed in a cue, with a maximum capacity of B, during a queuing interval T (step 300). Preferably, the queuing interval is on the order of one minute, with a degree of randomization around this basic time period. However, depending on expected arrival rates and the need to update the spot price, this time period can be varied significantly without effecting the operating principle of the present method. The unreserved capacity in the second stage is determined based on the second stage capacity (C) and the number of reserved subscribers currently in the second stage (n) (step 305). If, at the end of queuing interval T, there is sufficient second stage capacity to accommodate all arrivals (step 310), then all arrivals are admitted to the second stage and the spot price is set to a minimum price (floor value) (step 315). If there are more arrivals then second stage capacity, the m arrivals are combined with any unreserved subscribers in the second stage, and the subscriber's bids are sorted in descending order (step 320). Of these bids, the available second stage capacity is filled with the C−n highest bids from step 320 and the remaining subscribers are dropped (step 325). The spot price is then set to the highest dropped price (step 330). Preferably, the price of the resource to those subscribers who are admitted is not their particular bid price, but rather it is the price of the highest dropped bid. This is the current market price, or spot price, of the resource. The first stage bidding process is repeated at a regular average interval, equal to the queuing interval, T. Therefore, the spot market price is refreshed at this interval.

Once the spot price is determined, either at step 315 or 330, the subscribers enter the second stage as unreserved (step 204, FIG. 2) with the option to enter a reservation request (step 335). If the subscriber declines to enter a reservation, that subscriber is admitted as unreserved (step 340). If the subscriber wishes to enter a reservation, a reservation bid price and duration are entered by the subscriber and the system calculates a reservation fee based on these parameters, as well as current and expected future pricing and capacity considerations (step 345). Once the reservation fee is calculated, the subscriber is given the choice of accepting or rejecting the reservation (step 350). If the reservation is accepted by the subscriber, it is admitted as a reserved subscriber (step 355). Otherwise, the subscriber is entered as unreserved (step 340).

As mentioned above, to secure a reservation, the subscriber pays a reservation fee which is determined based on the current spot price and the duration of the reservation requested. In general, the reservation fee, or hold option price, is inversely proportional to the spot price and is directly proportional to the duration requested. Thus, a reservation request for a long duration entered with a low bid price would be higher than a short duration request when the bid price is higher. This pricing relationship, the calculation of which will be explained in further detail below, ensures that the price of the reservation is fair, discourages arbitraging and discourages resource misallocation.

After requesting a reservation, the subscriber is presented with a reservation fee and can accept or deny the reservation. If the subscriber accepts the reservation, the subscriber is changed from unreserved status to reserved status 206. Subscribers admitted in the second stage pay the current spot price unless this price exceeds their bid price at the time of entry. When the current spot price exceeds the bid price at the time of entry, unreserved subscribers are dropped in favor of new subscribers entering at the current spot price and reserved subscribers begin using the reserved allocation at the reserved bid price. Reserved subscribers can use the resource until they choose to terminate the use or the reserved allocation is consumed (reservation expires) 208. In the latter case, the subscriber becomes an unreserved subscriber and may request a new reservation based on the current spot price.

Figure 4:
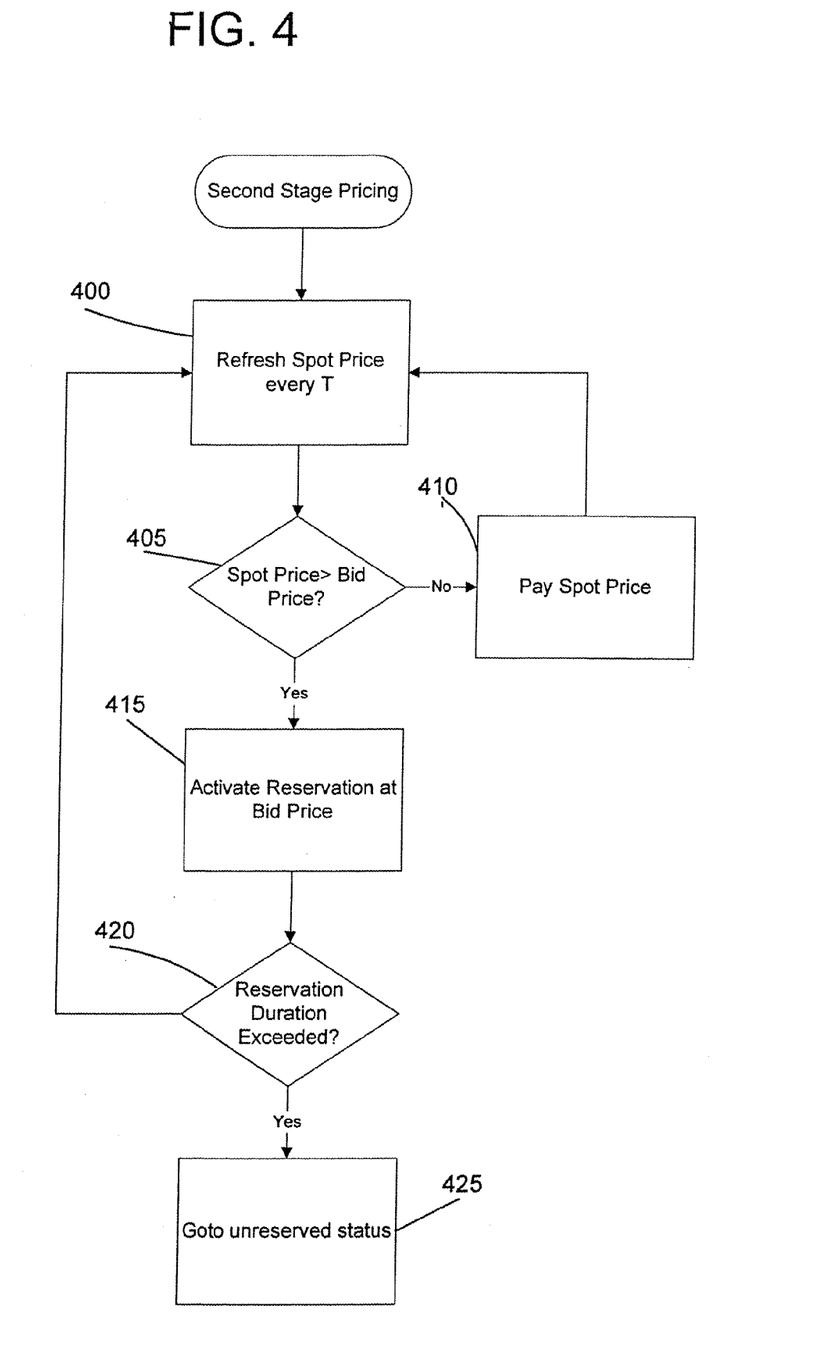
FIG. 4 is a flow chart illustrating a second stage pricing method, in accordance with the present invention.

The second stage pricing mechanism for reserved subscribers is illustrated in further detail in FIG. 4. As noted in connection with FIGS. 2 and 3, the spot price is refreshed at an interval (τ), which may be of fixed or random duration, based on new arrivals into the system (step 400). Each reserved subscriber's bid price is then compared to the current spot price to determine the cost of the resource to the subscriber (step 405). If the spot price is less than the subscriber's bid price, that subscriber pays the current spot price for the resource (step 410). However, if the spot price exceeds the subscriber's bid price, that subscriber's reservation is activated (step 415). The subscriber will continue to pay the bid price for as long as the spot price exceeds their bid price and/or the reservation duration has not been fully consumed (step 420). When the reservation duration is exceeded, the subscriber reverts to unreserved status and is given a new opportunity to bid for continued access (step 425).

Figure 5:
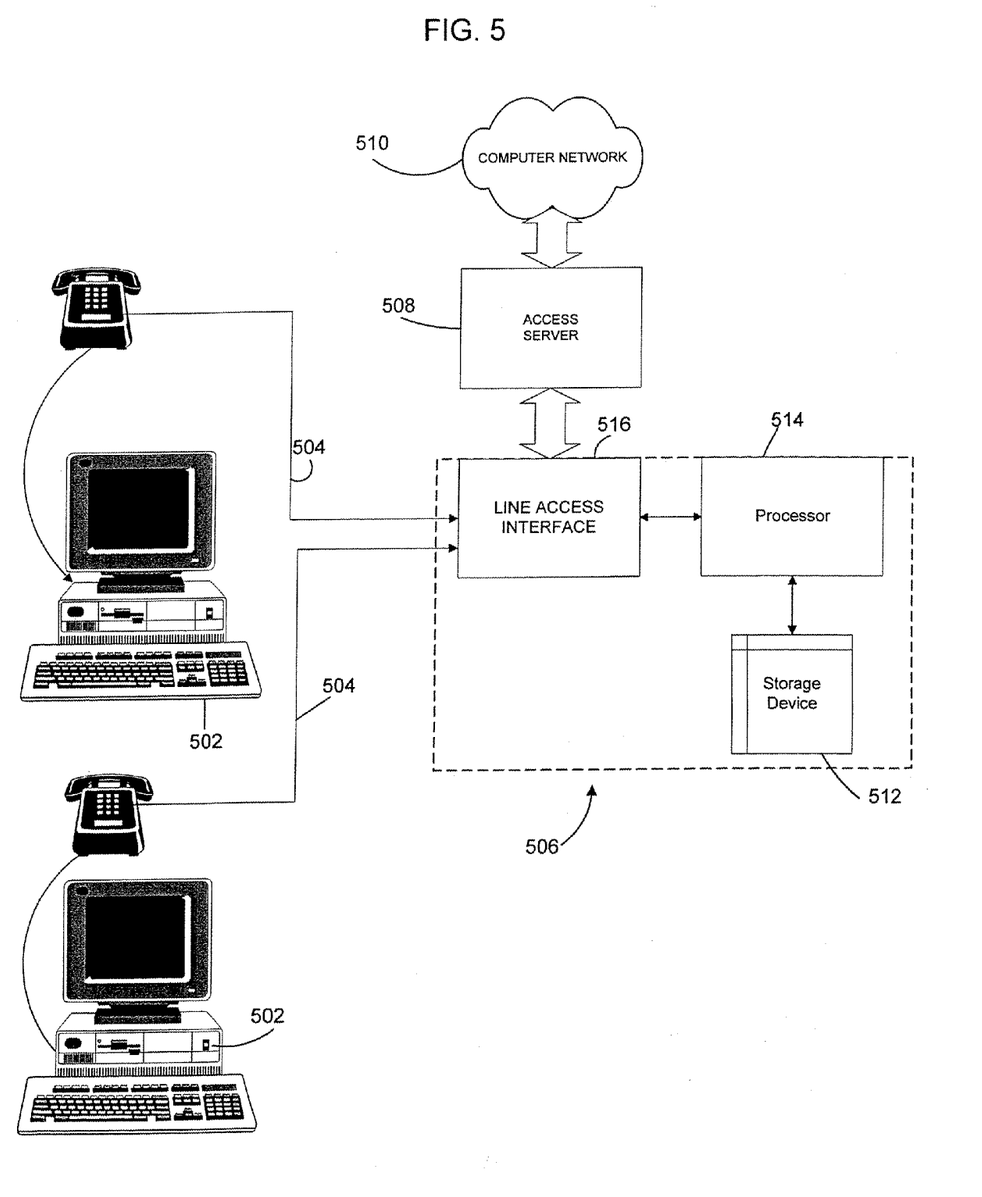
FIG. 5 is a block diagram of an exemplary computer communications network, in accordance with the present invention.

FIG. 5 is a block diagram illustrating an overview of the present system. In general, the system includes many subscriber computer systems 502 connected to communication lines 504, such as conventional telephone lines, coaxial cable and the like. Unlike conventional systems, the present system includes a dial-in server 506 interposed between the subscriber computer systems 502 and an access server 508, which ultimately provides subscriber access to a computer network 510, such as the Internet.

The subscriber computer systems 502 can take the form of computer terminals, personal computer systems, workstations, or other network configurable computing devices. The subscriber computer system 502 requires an appropriate network interface device, such as a modem and appropriate driver software. The computer system 502 should also have sufficient memory to load and run a small, memory resident algorithm which operates in conjunction with the dial-in server 506 to effect the present bidding and reservation methods. The allocation of modem lines is largely performed by the dial in server 506.

The dial-in server 506 can take the form of a high performance personal computer, or a computer workstation, such as the Ultra-SPARC2 workstation, manufactured by Sun Microsystems, of Palo Alto, Calif. The dial-in server 506 has a processor 514 which is coupled to and controls an access line interface 516 to establish the first and second stage modem line allocations illustrated in FIG. 1. The dial-in server 506 also maintains an account database in a computer data storage device 512, for maintaining records of each subscriber, such as access time, price, reservation fee, etc. The computer data storage device 512 can take the form of any conventional mass storage device, such as magnetic readable medium in the form of a computer disk drive or optical media in the form of a compact disk based storage system. The subscriber data stored in storage device 512 is stored and accessed in a conventional manner by processor 514. This data is ultimately used to bill the subscriber on a regular basis based on actual access time and reservation costs.

The access server 508 can also take the form of a high performance personal computer, or computer workstation, such as the Ultra-SPARC2 workstation or a specialized dial-up router server, such as an AS 5300, manufactured by Cisco Systems, Incorporated. The access server 508 provides access to the network 510 for subscribers 502, admitted by the dial-in server 506, in a conventional manner. The network 510 can be a dedicated private network, such as a company or campus based intranet, or an open, public network, such as the Internet. While the access server 508 and dial-in server 506 are operationally discrete, the operations of these functional blocks can be performed by a single computer system.

Calculation of the Reservation Fee

To secure a reservation, a subscriber pays a reservation fee which is determined based on the current spot price and the duration of the reservation requested. In general, the reservation fee, or hold option price, is inversely proportional to the subscriber's bid price and is directly proportional to the duration requested. Thus, a reservation request for a long duration entered when the bid price was low would be higher than a short duration request when the bid price is higher. This pricing relationship ensures that the price of the reservation is fair and discourages arbitraging and resource misallocation.

The reservation fee gives the subscriber the right to purchase access to the system at a future time, for up to a specified duration, at the bid price. Thus, the reservation fee can be viewed as an option contract to continuously purchase a duration of the resource at a given strike price. Since the reservation is a continuous option, rather than a one-time exercisable option, it can be referred to as a new derivative instrument called a "hold option."

As in economic models of derivative instruments, the reservation fee should be priced to remove undesirable arbitraging opportunities. In the case of a system for allocating modem lines, the pricing methods seek to discourage subscribers from connecting at periods of low usage and making reservations at a low price for an unreasonably long time period, regardless of need.

The capacity of a communications system can be modeled using known "heavy traffic" modeling techniques in order to estimate the capacity at a future time. To model the exemplary communications system, it is assumed that subscribers desiring access to the system arrive with a characteristic of a Poisson stream of rate $\lambda$, with independent identically distributed (i.i.d.) bid prices distributed according to a distribution F (density f). Call durations are exponentially distributed with mean 1/r. The block diagram of FIG. 1 illustrates such an exemplary queuing system. As set forth above, such a system can consist of two stages, with buffers of size B, corresponding to the B lines 102 and C, corresponding to the C lines 104, respectively.

In the first stage of processing, a second price auction is conducted where the winners enter the second stage, and the losers leave the system. Specifically, the first stage has an exponentially distributed service time $\tau$ with mean $1/\mu$. At a given service completion instant, let m be the number of customers in the first stage at that time and n the number in the second stage. The m first stage customers are ranked according to their bid prices. The (c−n) highest bids are accepted into the second stage, and the remaining (m−c−n) are dropped. The bid price of the highest dropped bid defines the new spot market price, which is valid until the next batch. If no customers are dropped, i.e. m≦C−n, then the spot market price is set to a minimum, or floor value.

The second stage is a server queue of size C with no waiting room, where each customer has an exponential service time (call duration) of mean 1/r. Subscribers arrive according to a batch Poisson process, with rate $\mu$, and batch sizes distributed according to $\{\beta_m\}_m{}^B=0$. Let $\rho=\lambda/\mu$. For $0\leq m<B$, $$\beta_m\_P\{m \text{ arrivals in\_}\} \quad (1)$$
$$= \frac{\rho^m}{(1+\rho)^{m-1}},$$

and $$B = \sum_{m=B}^{\infty} \frac{\lambda^m \mu}{(\mu+\lambda)^{m+1}} \quad (2)$$
$$= \left(\frac{\rho}{1+\rho}\right).$$

The steady-state distribution of the occupancy of the second stage queue can be shown to be of product form. However, for the purpose of pricing the reservations, a probabilistic model of its transient behavior in the future, given the current price is desired.

A tractable approximation for the queue occupancy process $N_t$, is determined by scaling the system following the well-known heavy traffic modeling approach which is, applied here to a system with batch arrivals.

Let $$\alpha\_\frac{\mu \bar{m}}{r}, \bar{m}\_\text{IEM} = \sum_{m=0}^{B} m\beta m, \text{ and } v^2\_E(M^2) = \text{sumfrom } m \stackrel{B}{=} 0 m\beta m.$$

Consider a sequence of scaled systems, indexed by l=1, 2, . . . , with capacity $C^{(l)}=l\alpha+\gamma\sqrt{l\alpha}$, where $\gamma$ is arbitrary; and batch arrival rate $\mu^{(l)}=l\mu$. Let $$Z_t^{(l)}\_\frac{N_t^{(l)}\ell\alpha}{\sqrt{\ell}}, \quad (3)$$

which is the translated and scaled version of the queue occupancy of the l-th system. The drift and diffusion coefficient respectively are $$a^{(l)}(z) \_ \lim_{\delta \to 0} IE\left[\frac{Z_{t+\delta}^{(l)} - Z_t^{(l)}}{\delta} \;\middle|\; Z_t^{(l)} = z\right] \quad (4)$$

$$= \begin{cases} -rz & \text{if } z < \gamma \\ -r(\gamma + \sqrt{\ell\alpha}) & \text{if } z \geq \gamma \end{cases}$$

and $$\sigma^{(l)2}(z) \_ \lim_{\delta \to 0} IE\left[\frac{(Z_{t+\delta}^{(l)} - Z_t^{(l)})^2}{\delta} LINEZ_t^{(l)} = z\right] \quad (5)$$

$$= \begin{cases} r(1 + v^2/\bar{m} + z/\sqrt{\ell}\,\alpha) & \text{if } z < \gamma \\ r(1 + \gamma/\sqrt{\ell\alpha}) & \text{if } z \geq \gamma \end{cases}$$

The premise underlying the above expressions is that as $l \to \infty$, $Z_t^{(l)} \Rightarrow Z_t$, (where $\Rightarrow$ denotes weak convergence, i.e., the probability distributions converge), where $Z_t$ is the diffusion process which solves the stochastic differential equation, $$dZ_t = a(Z_t)dt + \sigma(Z_t)dW_t, \quad (6)$$

where $W_t$ is a Brownian motion process.

Note that for $\gamma < \infty$, the offered load is expressed as $\mu^{(l)}/(C^{(l)}r) = (1+\gamma/\sqrt{l\alpha})^{-1}\_1$, which makes it a "heavy traffic" approximation.

The drift coefficient $a(.)$ and diffusion coefficient $\sigma^2(.)$ are obtained by letting $l \to \infty$ in equations (4) and (5), respectively. In the prior art heavy traffic models, $Z_t^{(l)} \Rightarrow Z_t$ holds if $a(.)$ and $\sigma^2(.)$ are continuous, which is clearly not the case here, since both have jumps at $z = \gamma$. However, a conditioning heuristic can be used to derive approximate steady-state blocking probabilities for the G/GI/s/0 (i.e. s servers, no waiting room) queue from the diffusion approximation for the corresponding G/GI/$\infty$ system. For exponential service times, it is known that a heuristic is also applicable to the diffusion process itself. The present approach is to apply a heuristic to the diffusion process itself, conditioning on $Z_t \leq \gamma$.

At time t, the queue occupancy is $N_t = n$, and a batch of size m arrives. The admission decision is made, and a new spot price results. In this section, we derive a model which is predictive of the future evolution of this price.

Of the m new customers, those with the C−n highest bid prices will be admitted and the spot price will be the (c−n+1)-th highest bid price. The bid prices are i.i.d., with a distribution F, which is assumed to be smooth. The probability that the price is x is the probability that in m draws, one draw will have a value equal x, and of the remaining m−1, C−n will be greater than x, and ((m−1)−C−n) will be less than or equal to x. This can be expressed by the equation:

$$f_{n,m}(x) \_ mf(x) \frac{(m-1)!}{(C-n)![(m-1)\cdot(C-n)]!}[F(x)]^{m\cdot C+n-1}[1-F(x)]^{C-n} \quad (7)$$

$$= m\frac{m!}{(C-n)!(m-1\cdot C+n)!}[F(x)]^{m\cdot C+n-1}[1-F(x)]^{C-n} f(x).$$

The distribution is $$F_{n,m}(x) \_ \int_0^x f_{n,m}(y)dy \quad (8)$$

$$= \int_0^{F(x)} \frac{m!}{(C-n)!(m-1\cdot C+n)!} u^{m\cdot C+n-1}(1-u)^{C-n} du,$$

where the last equality comes from substituting the previous expression, and making the change of variables $u=F(y)$, $du=f(y)dy$.

From a "first-order" approximation, the expected spot price given the occupancy n and the size of the batch arrival m is:

$$\varphi_{n,m} \_ \int_0^\infty [1 - F_{n,m}(x)]dx \quad (9)$$

$$= \int_0^\infty \int_{F(x)}^1 g(u, n, m) du\, dx$$

$$= \int_0^1 F_{(u)}^{-1} g(u, n, m) du,$$

where $$g(u, n, m) \_ \frac{m!}{(C-n)!(m-1\cdot C+n)!} u^{m\cdot C+n-1}(1-u)^{C-n}. \quad (10)$$

For the purpose of pricing a reservation beginning at time t, the future evolution of the market price can be characterized in terms of what is known at or just before t, namely the occupancy $N_t$. Which can be defined by the process:

$$\varphi(N_t) = IE[\varphi_{N_t,m}] = \sum_{m=0}^B \beta_m \varphi_{N_t,m}. \quad (11)$$

The price is approximated by a sequence of functions of the centered and scaled process $Z_t^{(l)}$, $$P^{(l)}(z) \_ \phi(z\sqrt{\alpha}l + \alpha). \quad (12)$$

Then, Ito's rule along with equation (4) yields a stochastic differential equation for P:

$$dP_t^{(l)} = \left[\frac{dP^{(l)}}{dz}a^{(l)} + \frac{1}{2}\frac{d^2P^{(l)}}{dz^2}\sigma^{(l)2}\right]dt + \frac{dP^{(l)}}{dz}\sigma^{(l)}dW_t. \quad (13)$$

Since $$P^{(l)}(z) = \sum_{m=0}^B \beta_m \int_0^1 F^{-1}(u)g^{(l)}(u, \sqrt{\alpha}\,\ell z + \alpha\ell, m)du, \quad (14)$$

where $g^{(l)}$ is defined as g with $C^{(l)}$ instead of C, it follows that $$\frac{dP(\ell)}{dz}(z) = \sum_{m=0}^B \beta_m \int_0^1 F^{(-1)}(u) \frac{\partial}{\partial z} g^{(l)}(u, \sqrt{\alpha}\,\ell z + \alpha\ell, m)du, \quad (15)$$

and $$\frac{d^2 P(\ell)}{dz^2}(z) = \sum_{m=0}^B \beta_m \int_0^1 F^{(-1)}(\mu) \frac{\partial^2}{\partial z^2} g^{(l)}(u, \sqrt{\alpha}\,\ell z + \alpha\ell, m)du, \quad (16)$$

Equation (13), along with equations (4), (5), (15) and (16), constitutes a diffusion model for the spot market price $P_t$, as $l \to \infty$. Equation (13) can be approximated by $dP_t=0$ when $z<\gamma$, and $$dP_t = \sum_{m=4V}^{B} \beta_m \left[ rC\left(\cdot \frac{1}{m} P_t + \frac{m\cdot 1}{m} K_1^{(m)} + \frac{1}{2} K_2^{(m)}\right) dt + \sqrt{rC}\left(\frac{1}{m} P_t \cdot K_1(m)\right) dW_t \right], \quad (17)$$

when $z=\gamma$. V is a constant related to the accuracy to which we want to evaluate g, and can typically be taken to be 1. $\forall m$, the constants $K_1^{(m)}$, $K_2^{(m)}$, which depend only on the bid price distribution F.

The condition $z=\gamma$ corresponds to $N_t=C$, which indicates that the system is full. Thus we have a model where the spot price remains constant when the system is below capacity, and varies when the system is full, which properly corresponds to the auction mechanism (with the constant minimum price, when it is not full). Note that this model does not consider the transitions between the two regimes, so this model is meaningful only during periods when the system is almost always full.

Taking the current market price $P_t$ as an initial condition, the solution of equation (17) provides a stochastic model of the future prices $\{P_\tau\}_{\tau \geq t}$. From that, the price of a reservation, arriving at time t, with a holding time T, and a bid price p can be determined. The value, or "fair price", at time t of an option to buy a security for a "strike price" p at a specific future date $\tau \geq t$ is, taking the "risk-free interest rate" to be 0, is stated as:

$$\zeta\_IE(P_{\tau,p})^+ \quad (18)$$

This is generally referred to as a European option, as opposed to an American option, which is the right to buy at any time between t and $\tau$. In the present context, this concept must be extended by defining the reservation as a hold option, a new kind of derivative instrument, which is an option to buy repeatedly at every time instant from t to t+T. Thus, the reservation fee is:

$$\phi(t, T, p)\_ \int_t^{t+T} \zeta\_ d\_. \quad (19)$$

If $K_1=K_2=0$, $\zeta_\tau$ is given explicitly by the Black-Scholes formula. A more general form of equation (17), can be expressed as:

$$dP\tau = (AP\tau + K_3)dt + (DP\tau + K_4)dW_\tau \quad (20)$$

for $\tau \geq t$, with known initial condition $P_t$, the solution $$\text{is } P\tau = S\tau \left[ P_t + \int_t^\tau \frac{K_3 \cdot DK_4}{S_u} du + \int_t^\tau \frac{K_4}{S_u} dW_u \right] \quad (21)$$

where $$S\tau\_\exp\left[ (A \cdot D^2/2)(\tau\cdot t) + \int_t^\tau D\, dW_u \right] \quad (22)$$

With the set of distributions $P_{t\_}\{IP(P\_\leq x|P_\tau), \_x:\_>t\}$, $\zeta_\tau$ can be evaluated for the case of $\tau>t$, and then the reservation fee $\phi$ can be determined.

The above described derivation describes a theoretical model of the reservation fee calculation. From these equations, a numerical approach can be implemented to calculate the appropriate reservation fee for a given spot price and duration. Appendix A is a computer listing of a program, written in a Java script programming language, which calculates the reservation fee using a numerical, Monte Carlo analysis approach.

The present systems and methods provide a solution for providing access to a system of finite resources in the face of excess demand. Subscribers are first admitted based on an initial bid price and are then given the option to secure continued access to the resource based on a fee-based reservation. The fee for the reservation is determined in a manner which is fair to the reserving subscriber, as well as all other subscribers, in that the reservation fee is priced to provide access at a cost which prevents arbitraging opportunities.

In a communications system, a dial-in server is interposed between subscriber terminals and an access server to effect the allocation of network access lines to subscribers desiring network access. The dial-in server periodically conducts a first stage, second price auction to selectively admit new subscribers into the system. Upon entry, the subscribers are provided with an option to secure a reservation for an allocation of access time. Based on the current spot price of the network access and the requested access duration, the dial-in server calculates a reservation fee for consideration by the subscriber computer. The subscriber can accept or reject the reservation and get admitted into the network by the dial-in server as either an unreserved or reserved subscriber, respectively. The dial-in server can disconnect unreserved subscriber computer systems from the network in the event that the spot price exceeds the bid price of the unreserved subscriber.

Although the present invention has been described in connection with specific exemplary embodiments, it should be understood that various changes, substitutions and alterations can be made to the disclosed embodiments without departing from the spirit and scope of the invention as set forth in the appended claims.

APPENDIX A

```
package ihn.dialex;
import ihn.merkato.*;
import ihn.math.Gaussian;
import ihn.math.Normal;
import java.util.Hashtable;
import java.util.Random;
/**
*@version $Revision: 1.6$, $Date: 1998/12/22 05:21:22 $
*@author Nemo Semret
*/
public class ReservationCalculator extends Hashtable {
```

APPENDIX A-continued

```
    int V2=1;
    int C,B;
    float lambda, mu,r;
    int dt;
    int horizon;
    public ReservationCalculator(int C,int B,float mu, float lambda,
                    float r, int horizon, int dt) {
      this.C = C;
      this.B=B
      this.mu=mu
      this.lambda=lambda;
      this.r=r;
      this.horizon= horizon:
      this.dt = dt;
      System.out.println(this);
    }
    public float interArrival( ) {
      return (float) (1.0/lambda);
    }
    public String toString( ) {
      return super.toString( )+" C = "+C +" B="+B +" mu="+mu +
            " lambda="+lambda+" r="+r+" horiz="+horizon+" dt="+dt;
    }
    float A, K3, D, K4;
    /**
    *Compute beta, K1, K2 for each m
    *and A, K3, D, K4.
    */
public void init( ) throws ArithmeticException {
    float [ ] K1;
    float [ ] K2;
    float [ ] beta;
    K1 = new float [B+1];
    K2 = new float [B+1];
    beta = new float [B+1];
    float [ ] w0 = new float [B+1];
    float [ ] w1 = new float [B+1];
    Gaussian phi = new Gaussian(0,1);
    float root2overpi = (float)Math.sqrt(2.0/Math.PI);
    float rho = lambda/mu;
    float zob = rho/(1+rho);
    float plop = 1/(1+rho);
    A= K3= D= K4=0;
    float rC = r*C;
    float rootrC = (float)Math.sqrt(rC);
    float u;
    for (int m=0; m<=B; m++, plop=plop*zob) {
      if(m>=4*V2) {
        u = (1- (float)Math.sqrt(1-(float)(4*V2)/m))/2;
        w0[m]=(float)Math.sqrt(u*m/(1-u));
        w1[m]=(float)Math.sqrt(1-u)*m/u);
        K1[m]= 2*phi.integral(w0[m],w1[m],(float)1.0);
        K2[m]= root2overpi*((float)Math.exp(-w0[m]*w0[m]/2)*(w0[m]/m - (float) 1.0/w0[m]) -
              (float)Math.exp(-w1[m]*w1[m]/2)*(w1[m]/m - (float) 1.0/w1[m]))+2*K1[m];
        if(m<B) beta[m]=plop;
        else beta[m]= plop*rho;
        A -=beta[m]*rC/m;
        K3 +=beta[m]*rC*((m−1)*K1[m]/m + K2[m]/m);
        D+= beta[m]*rootrC/m;
        K4 -=beta [m]*K1[m]*rootrC;
      }
    }
    System.out.println("A="+A+" K3="+K3+" D="+D+" K4="+K4);
}
/**
* Generates a forward sample path of the process P.
* @param p0 The initial price P[0]=po;
* @param T The duration.
* @return An array of size 1+floor(T/dt)
*/
float [ ] fwdSamplePath(float p0, int T, int dt) {
    float dP=0, dW=0;
    float [ ]P = new float[1+T/dt];
    //  Normal norm = new Normal(100);
    Random rand new = Random(System.currentTimeMillis( ));
    P[0]=p0;
    int i,t;
    for( t=dt, i=1; t<=T; i++, t+=dt) {
      //  dP = A*P[i-1]+K3*dt + (D*P[i-1]+K4)*norm.nextSample( )*(float)Math.sqrt(dt);
```

APPENDIX A-continued

```
        dP = A*P[i−1]+K3*dt + (D*P[i−1]+K4)
            *(float) (rand.nextDouble( ) <0.5 ? −1.0 : 1.0)
            *(float)Math.sqrt(dt);
        P[i]=P[i−1]+ dP;
    }
    return P;
}
/**
 * For each time t between the current and T, we get an array
 * which contains the histogram of P[t].
 *@param NBINS Number of bins in the histogram.
 *@param p0 The current price.
 *
 */
int [ ][ ] monteCarlo(float p0, int T) {
    int [ ][ ] histog = new int[1+T/dt][NBINS];
    float [ ] samplepath;
    int n,t,i;
    int p;
    for ( n=0; n<nsamples; n++) {
        samplepath = fwdSamplePath(p0,T,dt);
        for (t=0, i=0; t<T; i++, t+=dt) {
            p=(int)( samplepath[i]*NBINS);
            P = p<0 ? 0 :p;
            p= p>NBINS−1? NBINS−1 :p;
            histog[i][p]++;
        }
    }
    return histog;
}
/**
 * Number of bins in each histogram
 */
int NBINS=10;
/**
 * Number of sample paths for each fastFwd
 */
int nsamples=100;
public synchronized void fastFwd(float p0) {
    if( get(new Integer((int)(p0*NBINS))) == null) {
        System.out.print("FFing "+horizon+" for price "+p0);
        long a=System.currentTimeMillis( );
        put(new Integer((int)(p0*NBINS)), monteCarlo(p0, horizon));
        System.out.println(" done in "+(System.currentTimeMillis( )-a));
    }
}
/**
 *@param p0 The current market price.
 *@param b The reservation for which the fee is computed.
 */
public Reservation fee(Bid b, float p0) {
    int x,t,i;
    float fee=0;
    float duration = Math.min(b.qty,horizon);
    int [ ][ ] histogram = (int [ ][ ]) get(new Integer((int)(p0*NBINS)));
    if(histogram == null) {
        fastFwd(p0);
        histogram = (int [ ][ ])get(new Integer((int)(p0*NBINS)));
    }
    for(i=0, t=0; t<=duration; t+=dt, i++)
        for( x=0; x<NBINS; x++)
            fee += (Math.max((x+0.5)/((float)NBINS) − b.price,0)
                *histogram[i][x])/nsamples;
    fee =fee*dt;
    Reservation foo=new Reservation(b);
    b.qty =duration;
    foo.fee= fee;
    //   System.out.println(p0+""+foo.price+""+foo.qty+""+foo.fee+""+foo.bidderid);
    return foo;
    }
}
```

The invention claimed is:

1. A method for electronically allocating a resource among subscribers in a system including a processor programmed to control an access interface, and a first stage and a second stage, the method comprising:

determining with the processor an available capacity in the second stage;

queuing, at the processor, arriving subscribers bidding for an allocation of the resource in the first stage;

periodically admitting, by controlling the access interface with the processor, at least a portion of the arriving subscribers into the second stage based on respective bid amounts and second stage resource availability;

determining, with the processor, a spot price of the resource based on at least one arrival subscriber not admitted;

offering, with the processor, admitted subscribers a reservation, having a reservation fee, to secure a future allocation of the resource at a given bid price, subscribers accepting the reservation fee being admitted as reserved subscribers, those rejecting the reservation fee being admitted as non-reserved subscribers;

displacing non-reserved subscribers whose bid prices are below the spot price by controlling the access interface; and activating, with the processor, a reservation of a reserved subscriber whose bid price is below the spot price.

2. The method of claim 1, wherein the reservation fee is calculated by the processor and is based on the bid price and a requested duration of the reservation.

3. The method of claim 2, wherein the reservation fee is inversely proportional to the bid price and directly proportional to the requested duration of the reservation.

4. The method of claim 2, wherein after a reservation is activated by the processor, the subscriber is displaced upon expiration of the duration of the reservation by controlling the access interface to displace the subscriber.

5. The method of claim 1, wherein the spot price of the resource is the highest bid price of the at least one arrival subscriber not admitted.

6. The method of claim 1, wherein the availability of the resource in the second stage is defined as the total quantity of the resource in the second stage less a reserved quantity of the resource in the second stage.

7. The method of claim 1, wherein the resource is communication lines in a computer network access system and where the first and second stage each contain a discrete number of communications lines.

* * * * *